United States Patent [19]
Rust et al.

[11] Patent Number: 5,136,637
[45] Date of Patent: Aug. 4, 1992

[54] METHOD AND APPARATUS FOR AUTOMATIC REDIALING OF TELEPHONE NUMBERS

[75] Inventors: Tracy Rust; Cathy Arledge, both of Austin; Gordon Ford, Round Rock, all of Tex.; Nigel James, Aberdeen, Md.

[73] Assignee: Rolm Systems, Santa Clara, Calif.

[21] Appl. No.: 543,119

[22] Filed: Jun. 22, 1990

[51] Int. Cl.⁵ .............................................. H04M 1/00
[52] U.S. Cl. ................................ 379/356; 379/355; 379/216
[58] Field of Search ................ 379/354, 355, 356, 216

[56] References Cited

U.S. PATENT DOCUMENTS

| | | | |
|---|---|---|---|
| 4,431,870 | 5/1984 | May et al. | 379/357 |
| 4,908,853 | 3/1990 | Matsumoto | 379/354 |
| 4,930,155 | 5/1990 | Kurokawa | 379/354 |
| 4,933,968 | 6/1990 | Iggulden | 379/354 |

Primary Examiner—James L. Dwyer
Assistant Examiner—Jhancy Augustus
Attorney, Agent, or Firm—Michael B. Einschlag

[57] ABSTRACT

Method and apparatus for capturing and saving recently dialed telephone numbers and for redialing automatically a telephone number from among the most recently dialed telephone numbers. Embodiments of the present invention: (a) capture an outgoing telephone number when it is dialed by a caller; (b) enter the telephone number into a database comprised of the last N telephone numbers that were dialed, where N is a predetermined number of telephone numbers, while eliminating duplicative entries for a particular telephone number; (c) display the telephone numbers in the directory in response to caller input; and (d) cause a telephone number in the directory to be redialed in response to caller input.

1 Claim, 5 Drawing Sheets

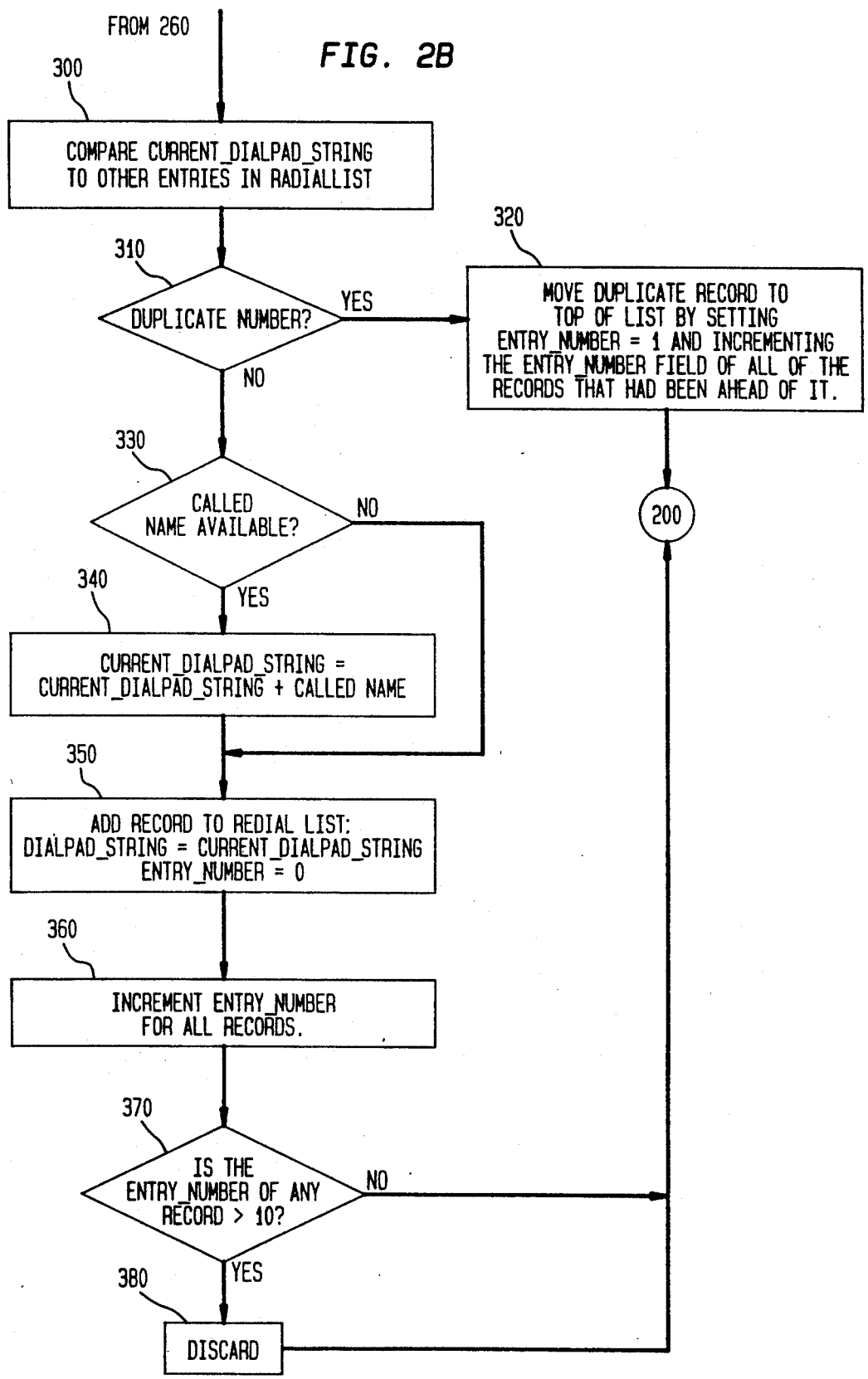

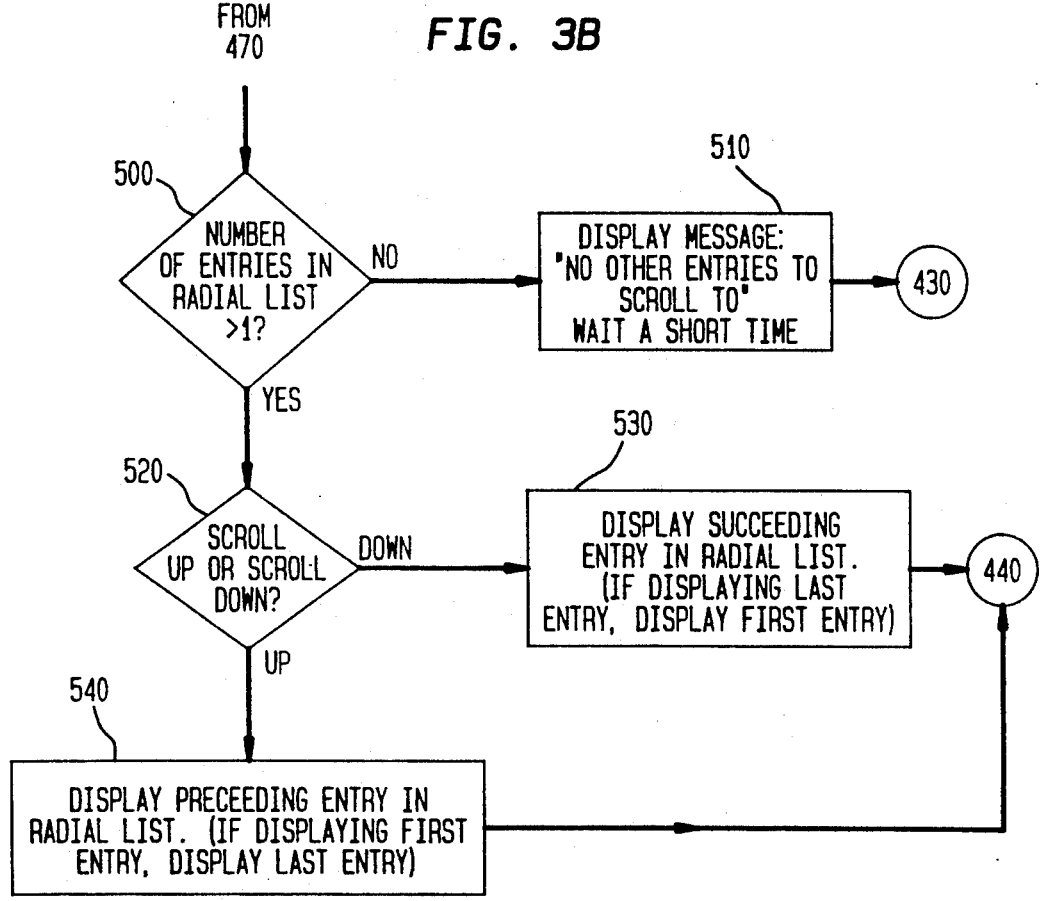

METHOD AND APPARATUS FOR AUTOMATIC REDIALING OF TELEPHONE NUMBERS

TECHNICAL FIELD OF THE INVENTION

The present invention pertains to method and apparatus for redialing a telephone and, in particular, to method and apparatus for capturing and saving recently dialed telephone numbers and for redialing automatically a telephone number from among the most recently dialed telephone numbers.

BACKGROUND OF THE INVENTION

In using a telephone system, a caller frequently finds it necessary to redial a previously dialed telephone number, albeit not the most recently dialed telephone number. At present this function is performed in several ways. First, people use a manual method of writing down previously dialed telephone numbers on a scrap of paper or in a notebook, or they retrieve the previously dialed telephone numbers from a directory. The disadvantage of this method is the inherent inefficiencies and propensity for error entailed thereby.

Second, certain presently available telephone systems provide a capability of redialing wherein the last number dialed. The disadvantage of this method is that it only saves the last number dialed.

Third, a ROLMPhone manufactured by ROLM Systems of Santa Clara, California provides a "Save/Repeat" capability. The "Save/Repeat" capability must be invoked by a caller prior to disconnecting from the present called party. In addition, the caller must remember the telephone number which has been saved since the saved telephone number may not be the most recently dialed telephone number.

In light of the above, there is a need for a method and apparatus for capturing and saving recently dialed telephone numbers and for redialing automatically a telephone number from among the most recently dialed telephone numbers.

SUMMARY OF THE INVENTION

Embodiments of the present invention advantageously satisfy the above-identified need in the art and provide method and apparatus for capturing and saving recently dialed telephone numbers and for redialing automatically a telephone number from among the most recently dialed telephone numbers. In addition, in a preferred embodiment of the present invention, the captured telephone numbers are stored in a list, the list may be displayed to the caller, and the caller may scroll through the list and request that any of the telephone numbers contained therein be redialed automatically.

Embodiments of the present invention: (a) capture an outgoing telephone number when it is dialed by a caller; (b) enter the telephone number into a database comprised of the last N telephone numbers that were dialed, where N is a predetermined number of telephone numbers, while eliminating duplicative entries for a particular telephone number; (c) display the telephone numbers in the directory in response to caller input; and (d) cause a telephone number in the directory to be redialed in response to caller input.

A preferred embodiment of the present invention comprises: (a) a telephone set; (b) processor means for interacting with the telephone set to capture dialed telephone numbers; (c) memory means for interacting with the processor means for providing storage of a directory of a predetermined number of the most recently dialed telephone numbers; (d) display means for providing a display of the directory in response to caller input; and (e) processor means for interacting with the telephone set for causing the telephone set to dial telephone numbers from the directory in response to caller input.

As those of ordinary skill in the art can appreciate, although a preferred embodiment comprises storing the most recently dialed telephone numbers, dialed telephone numbers can be stored in accordance with any predetermined selection criteria, such as, for example, telephone numbers dialed in the morning, on a particular day of the week and so forth.

BRIEF DESCRIPTION OF THE DRAWING

A complete understanding of the present invention may be gained by considering the following detailed description in conjunction with the accompanying drawing, in which:

FIGS. 2A and 2B comprise a flowchart of software which is used to fabricate a preferred embodiment of the present invention for creating a directory of most recently dialed telephone numbers; and FIGS. 3A and 3B comprise a flowchart of software which is used to fabricate a preferred embodiment of the present invention for displaying a directory of most recently dialed telephone numbers and for causing the system to dial a telephone number in the list.

DETAILED DESCRIPTION

Figure 1:
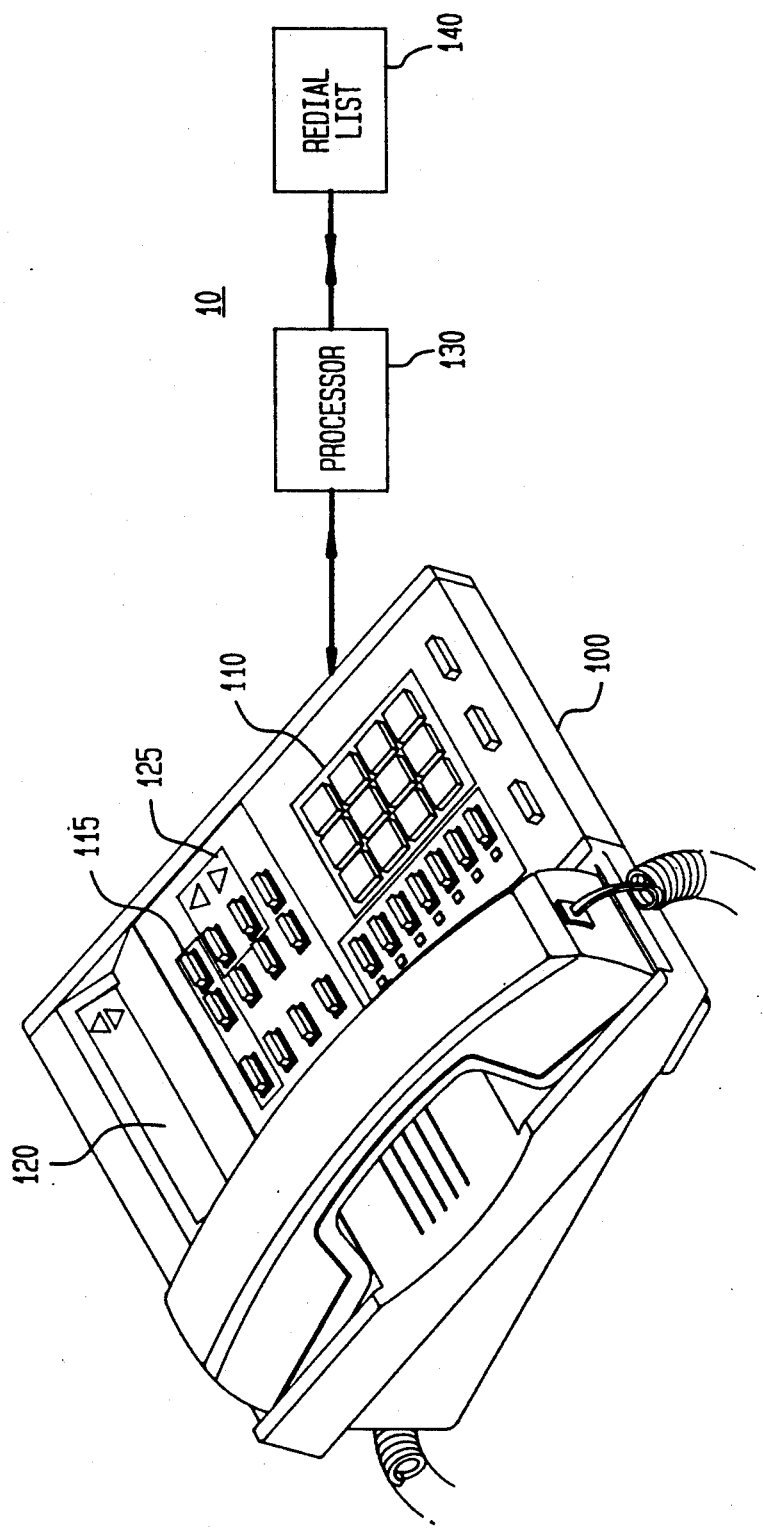
FIG. 1 is an block diagram of an embodiment of the present invention.

FIG. 1 is a block diagram of embodiment 10 of the present invention. As shown in FIG. 1, telephone 100 is comprised of numeric keypads 110, function keypads 115, display 120, and SCROLL-UP and SCROLL-DOWN function keypads 125. Telephone 100 is connected to processor 130 and processor 130 is connected, in turn, to database system 140 which maintains a redial list in a manner which is described in further detail below. Telephone 100 is fabricated in accordance with methods well known to those of ordinary skill in the art and may be a telephone which is commercially available such as, for example, a ROLMPhone 244/PC which is manufactured by ROLM Systems of Austin, Texas.

In the embodiment shown in FIG. 1, display 120 is comprised of a two-line LCD display, however, the present invention is not limited to two-line displays and display 120 may comprise any number of lines.

Telephone 100 sends signals to processor 130, which signals identify keypad strokes and processor 130 sends signals to telephone 100, which signals produce character displays on display 120 or cause telephone 100 to dial a telephone number. In a preferred embodiment of the present invention, processor 130 is an IBM PS/2 personal computer which is available from International Business Machines Corp. but processor 130 may be any type of processor which can carry out the steps indicated in the flowcharts of FIGS. 2A-2B and FIGS. 3A-3B such as, for example, a microprocessor that may be configured to reside within the physical confines of telephone 100.

Database 140 is a database system which stores a database on, for example, magnetic disk storage. Further, information is accessed from this database and this database is created in a manner which is well known to those of ordinary skill in the art. It should be clear to those of ordinary skill in the art that the present invention is not limited to the use of a database which is created and maintained by a processor such as a personal computer and, in other embodiments, database system 140 may reside on memory modules which reside within the physical confines of telephone 100 itself.

Numeric keypads 110 comprise numerical keypads which are well known in the art such as numeric keypads which are associated with a telephone set and are used for dialing telephone numbers.

Lastly, function keypads 115 and SCROLL-UP and SCROLL-DOWN function keypads 125 are keypads which are well known to those of ordinary skill in the art for producing signals which are identified by processor 130 as corresponding to predetermined functions. Those of ordinary skill in the art should understand that the present invention is not limited to the use of a particular number of predetermined function keypads since, under software control, particular keypads may be used to provide several functions during the operation of the apparatus to perform a predetermined function. Further, those of ordinary skill in the art should also understand that the present invention does not require the use of function keypads at all because, instead of using a particular function keypad to invoke a specific function, predetermined combinations of numeric keypad strokes may be interpreted by processor 130 to invoke such specific functions.

Before describing the operation of embodiment 10 of the present invention shown in FIG. 1 in detail with reference to FIGS. 2A-2B and 3A-3B, we will describe how embodiment 10 operates in general.

Assume that a caller places a telephone call by dialing a telephone number using numeric keypads 110. As the numeric keypads 110 are pressed, a signal is transmitted to processor 130 which processor 130 uses to determine the telephone number that the caller is dialing. Then processor 130 interacts with database system 140 to enter this telephone number into a redial list comprised of the N most recently dialed telephone numbers. N is a predetermined number and, in a preferred embodiment of the present invention, the steps of entering the telephone number into the redial list eliminates redundant entries, i.e., the same telephone number will not be entered twice. This process of capturing and saving the N most recently dialed telephone numbers is performed on a continuing basis. Further, in accordance with the preferred embodiment of the present invention, the (N+1)st most recently dialed telephone number is purged from the redial list in database system 140 on a continuing basis.

Next, if the caller invokes the function keypad of function keypads 115 which corresponds to the DISPLAY REDIAL LIST feature, processor 130 retrieves the most recently dialed telephone number from the redial list in database system 140 and transmits it to telephone 100 for display on display 120. The caller may the use the SCROLL-UP and SCROLL-DOWN function keypads to cause processor 130 to display various entries in the redial list. At any time, the caller may have telephone 100 dial a displayed telephone number by pressing the appropriate one of function keypads 115. As is well known to those of ordinary skill in the art, such function keypads may be specific ones of function keypads 115 which are reserved exclusively for use by the caller to invoke specific functions or, in other embodiments, such function keypads may be software settable function keypads or, in still other embodiments, the function keypads may be a combination of reserved and software settable function keypads. In an embodiment wherein a specific function keypad is set by software, processor 130 sends a message to telephone 100 to be displayed on display 120 to indicate the particular function which is presently invoked by a particular one of function keypads 115.

We now turn to describe the manner in which embodiment 10 operates in detail with reference to the flowcharts shown in FIGS. 2A-2B and 3A-3B.

Figure 2A:
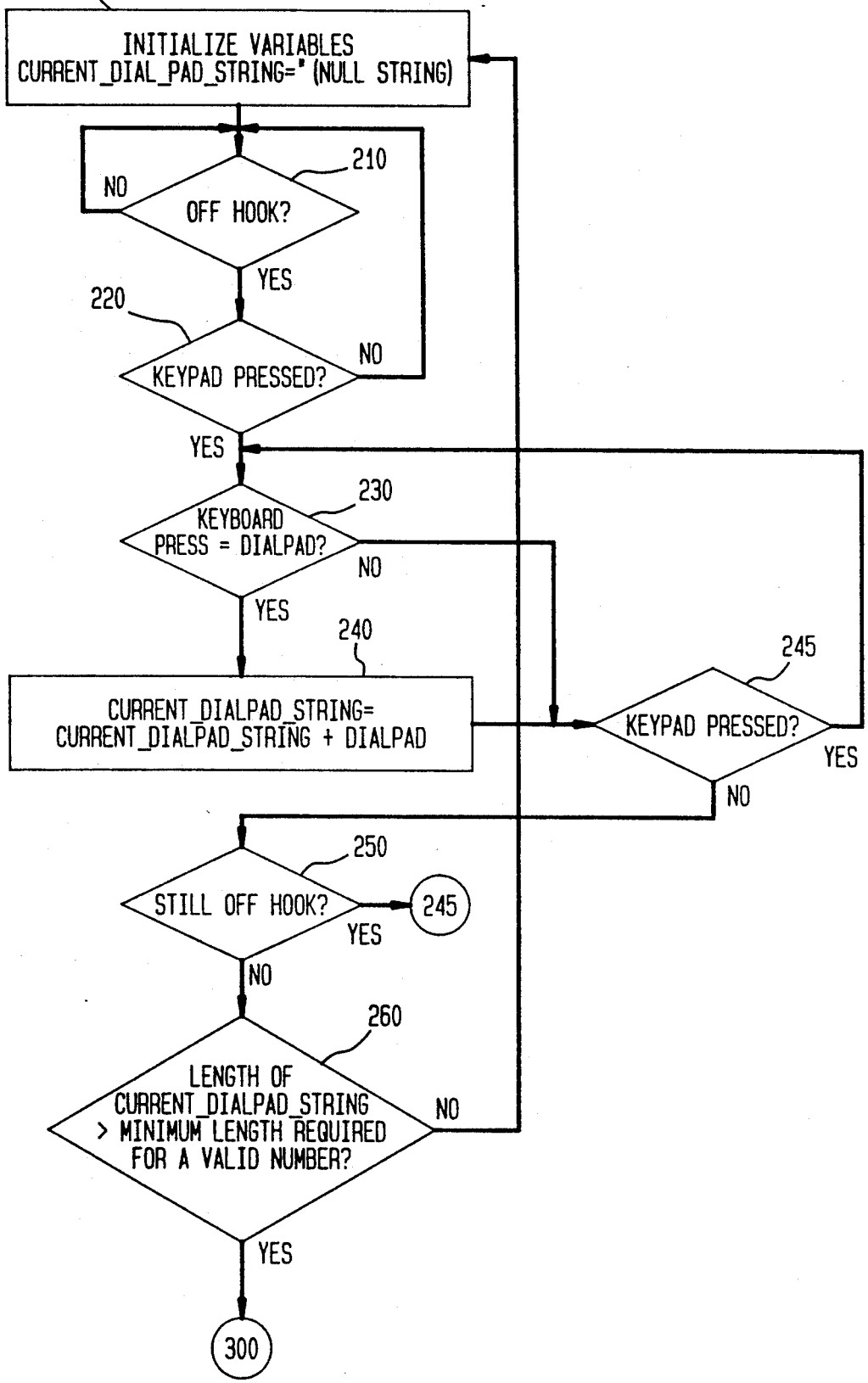

Specifically, we will describe the manner in which a redial list is created with reference to FIGS. 2A-2B. As shown at FIG. 2A, at box 200, the program in processor 130 initializes a variable referred to as the current Dial_Pad_String by setting it equal to a null string to indicate that the system is ready for the first character in a telephone number to be entered. Then control is transferred to decision box 210.

At decision box 210, the program determines whether the telephone is off hook by checking a variable which is set automatically. The variable is set automatically in response to a signal which is generated by telephone 100 and transferred to processor 130. If the telephone is not off hook, then control remains at decision box 210 for a periodic check, otherwise, control is transferred to decision box 220.

At decision box 220, the program determines whether a keypad has been pressed. If a keypad has not been pressed, the program just loops back to decision box 210. However, if a keypad was pressed, control is transferred to decision box 230.

At decision box 230, the program determines whether the pressed keypad was a dial keypad. If it was, then control is transferred to box 240 to update the current Dial_Pad_String, otherwise, control is transferred to decision box 245.

At box 240, the program updates the current Dial_Pad_String by adding the most recently pressed dial keypad to the string. Then control is transferred to decision box 245.

At decision box 245, the program determines whether a key has been pressed. If it has control is transferred to decision box 230 decision box 250.

At decision box 250, the program determines whether the telephone is still off hook. If it is, control is transferred to decision box 245 to await the next keypad, otherwise, control is transferred to decision box 260.

At decision box 260, the program determines whether the length of the current Dial_Pad_String is greater than the minimum length for a valid telephone number. If so, then control is transferred to box 300, otherwise, control is transferred to box 200 to initialize the sequence again.

At box 300, the program starts to interrogate a redial list in database 140 by comparing the current Dial_Pad_String to the other entries in the redial list. Then, control is transferred to decision box 310.

At decision box 310, the program determines whether the current string is the same as a previously entered telephone number. If it is, control is transferred to box 320, otherwise, control is transferred to decision box 330.

At box 320, the program moves the duplicate record to the top of the redial list by setting Entry_Number=1 and by incrementing the Entry_Number field of all of the records that preceded it. The redial list is then placed back into database 140 and control is transferred to box 200.

At decision box 330, the program determines whether a called party identification such as the name of the called party which corresponds to this telephone number is available from database 140 in another directory thereof such as, for example, a calling name data base which is sent to database 140 by a telephone switch (not shown) which interfaces with telephone 100. If it is not available, control is transferred to box 350, whereas, if the name of the called party is available, control is transferred to box 340.

At box 340, the program adds the called party name to the current Dial_Pad_String. Then, control is transferred to box 350.

At box 350, the program adds a record to the redial list and sets the Entry_Number of this record to 0. Then, control is transferred to box 360.

At box 360, the program increments the Entry_Number field for each record in the redial list. Then, control is transferred to decision box 370.

At decision box 370, the program determines whether the Entry_Number field of any record in the redial list is greater than a predetermined number, for example, 10. If so, then control is transferred to box 380, otherwise, control is transferred to box 200 to await the next input.

At box 380, the program discards records having Entry_Number field greater than the predetermined number from the redial list. Then, control is transferred to box 200 to await the next input.

Note, that although the preferred embodiment set forth above places new records at the top of the redial list, i.e., Entry_Number=1, other embodiments may be fabricated wherein the last entry may be placed at other positions, such as, for example, at the end of the list. In such a case, Entry_Number=number of records+1.

Figure 3A:
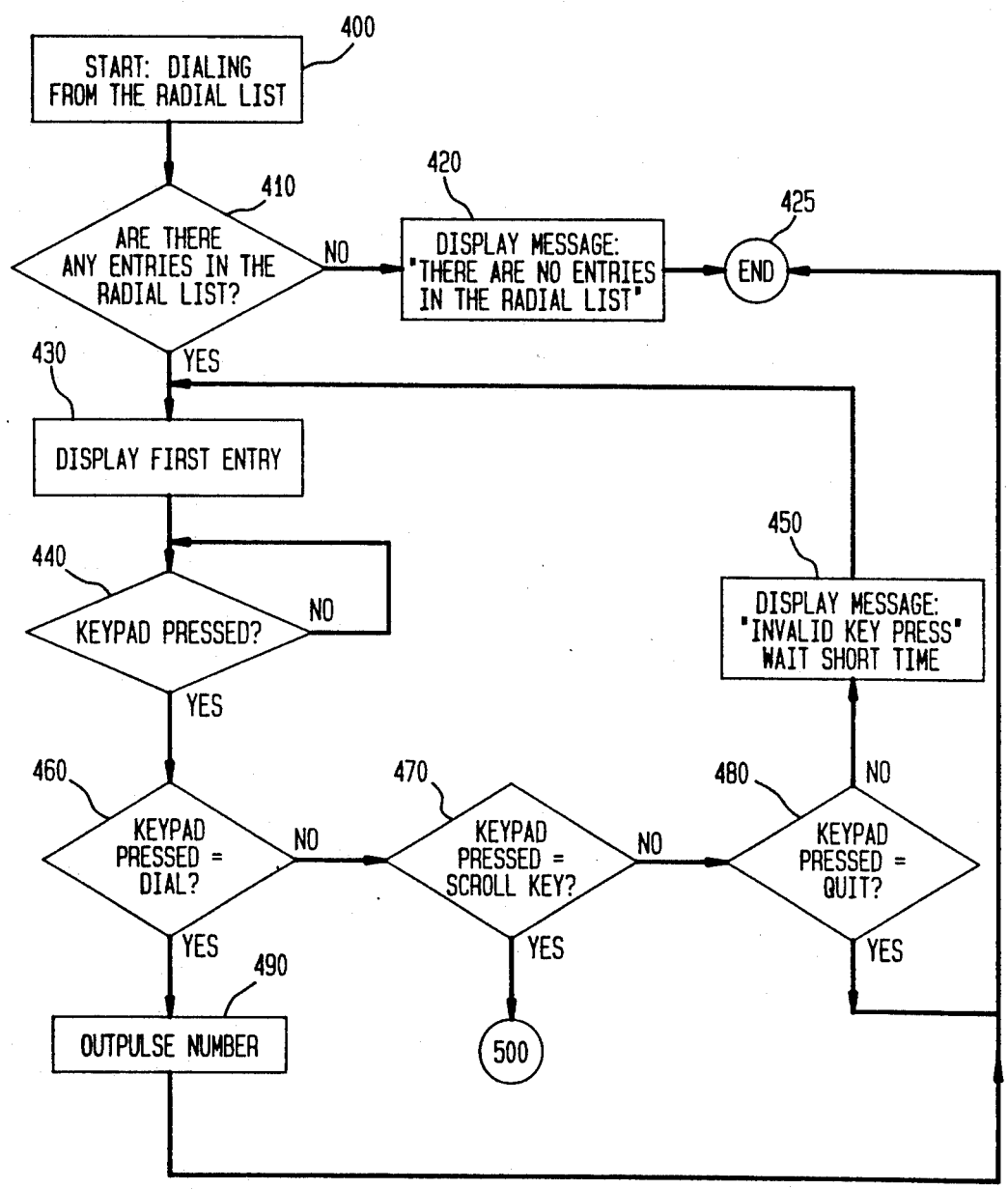

We will now describe the manner in which a redial list is used to place telephone calls with respect to FIGS. 3A-3B. As shown FIG. 3A, at box 400, the caller has pressed a REDIAL LIST function key and the program recognizes that and accesses the redial list in database 140. Then, control is transferred to decision box 410.

At decision box 410, the program determines whether there are any entries in the redial list. If there are no entries in the redial list, control is transferred to box 420, otherwise, control is transferred to box 430.

At box 420, processor 130 sends a message to display 120 to display the following massage: "THERE ARE NO ENTRIES IN THE REDIAL LIST." The, control is transferred to box 425 to terminate this function.

At box 430, processor 130 sends a message to display 120 to display the first entry in the redial list. Then, control is transferred to decision box 440.

At box 440, the program determines whether a keypad was pressed. If it was, control is transferred to decision box 460, otherwise, control is passed to decision box 440 to await the pressing of a keypad.

At decision box 460, the program determines whether the keypad is the DIAL function keypad. If it was, control is transferred to box 490, otherwise, control is transferred to decision box 470.

At box 490, processor 130 transmits the telephone number to telephone 100 with a message to cause telephone 100 to dial the telephone number, Then, control is transferred to box 425.

At decision box 470, the program determines whether the keypad is a SCROLL function keypad. If it was, control is transferred to decision box 500, otherwise, control is transferred to decision box 480.

At decision box 480, the program determines whether the keypad is the QUIT function keypad. If it was, control is transferred to box 425, otherwise, control is transferred to box 450.

At box 450, processor 130 sends a message to display 120. to display the following message: "INVALID KEY PRESS." After waiting a short time, control is transferred to box 430 to display the first entry.

At decision box 500, the program determines whether the number of entries in the redial list is greater than 1. If so, then, then control is transferred to decision box 520, otherwise, control is transferred to box 510.

At box 510, processor 130 sends a message to display 120 to display the following message: "NO OTHER ENTRIES FOR SCROLLING." After waiting a short time, control is transferred to decision box 430 to display the first entry.

At decision box 520, the program determines whether the function keypad was a SCROLL-UP or a SCROLL-DOWN function keypad. IF it was a SCROLL-UP function keypad, control is transferred to box 540, otherwise, control is transferred to box 530.

At box 530, processor 130 sends a message to display 120 to display the succeeding entry in the redial list. If the presently displayed entry is the last, then the redial list is "wrapped around" by next displaying the first entry. Then, control is transferred to decision box 440 to await the next key press.

At box 540, processor 130 sends a message to display 120 to display the preceding entry. If the presently displayed entry is the first, then the redial list is "wrapped around" by next displaying the last entry. Then, control is transferred to decision box 440 to await the next key press.

Further, those skilled in the art recognize that further embodiments of the present invention may be made without departing from its teachings. For example, embodiments of the present invention may incorporate the time and date of the entries in the redial list for display to callers.

In addition, as those of ordinary skill in the art can appreciate, although a preferred embodiment comprises storing the most recently dialed telephone numbers, dialed telephone numbers can be stored in accordance with any predetermined selection criteria, such as, for example, telephone numbers dialed in the morning, on a particular day of the week and so forth.

What is claimed is:

1. Apparatus for capturing and storing telephone numbers dialed from a telephone set and for causing the telephone set to dial automatically one of the stored telephone numbers comprises:
   interaction means for interacting with the telephone set for capturing telephone numbers which are dialed by the telephone set;
   memory means for storing telephone numbers which are captured by the interaction means, the telephone numbers which are stored are determined in accordance with predetermined selection criteria;
   display means for providing a display of the stored telephone numbers; and
   the interaction means further comprising means for causing the telephone set to dial at least one of the stored telephone numbers;
   wherein the predetermined selection criteria excludes the storing of duplicate telephone number; and
   wherein the predetermined selection criteria further comprises time and/or data information.

* * * * *